Dec. 20, 1932.          C. E. CHASE ET AL          1,891,797
ROTOR FOR DISPLAY DEVICES
Filed March 11, 1931          2 Sheets-Sheet 1
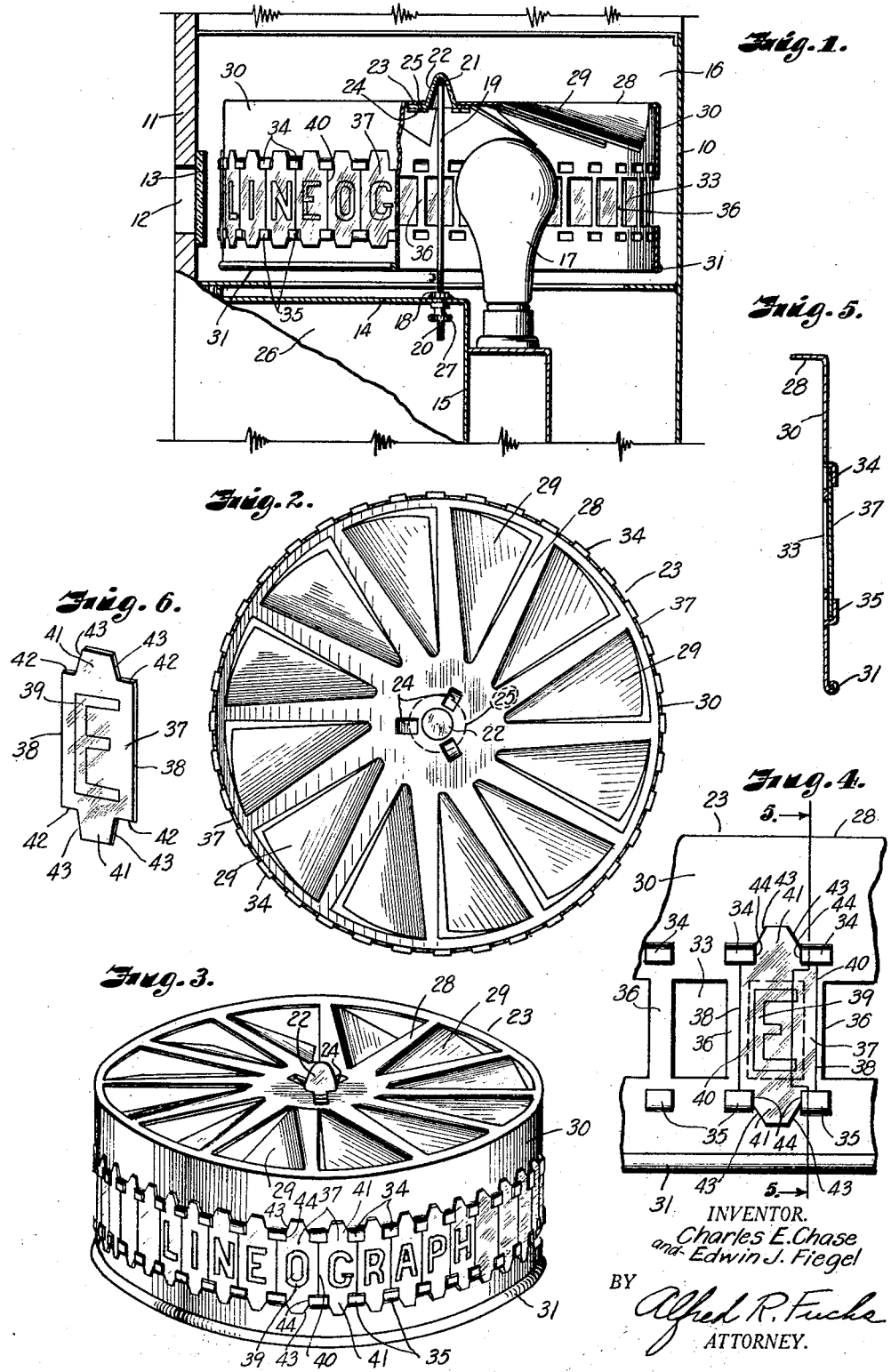
INVENTOR.
Charles E. Chase
and Edwin J. Fiegel
BY Alfred R. Fuchs
ATTORNEY.

Dec. 20, 1932.  C. E. CHASE ET AL  1,891,797
ROTOR FOR DISPLAY DEVICES
Filed March 11, 1931   2 Sheets-Sheet 2
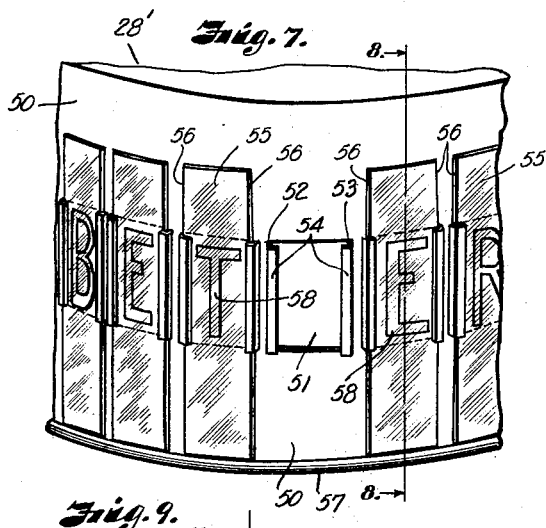
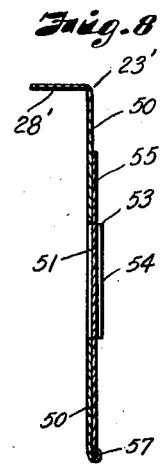
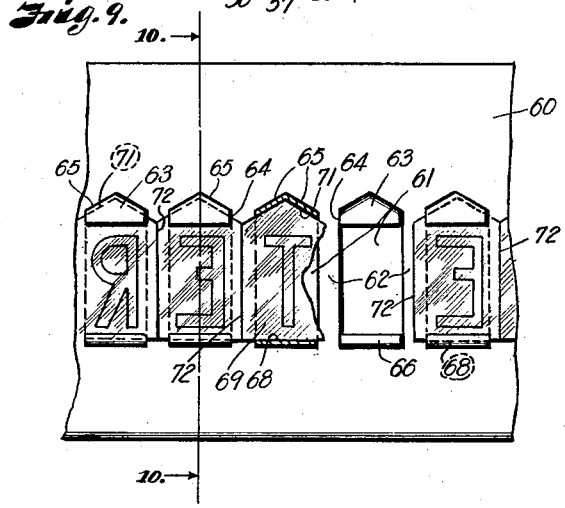
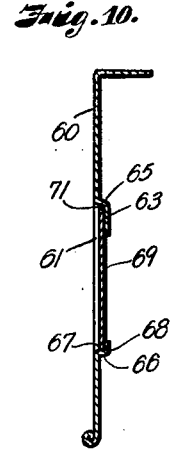
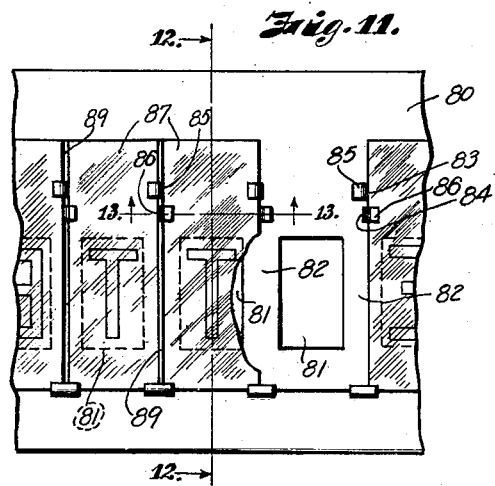
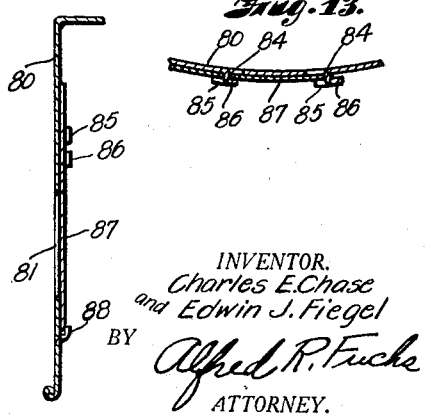
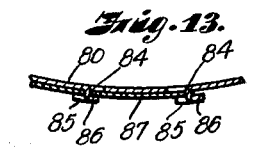
INVENTOR.
Charles E. Chase
and Edwin J. Fiegel
BY
Alfred R. Fuchs
ATTORNEY.

Patented Dec. 20, 1932

1,891,797

UNITED STATES PATENT OFFICE

CHARLES E. CHASE AND EDWIN J. FIEGEL, OF KANSAS CITY, MISSOURI, ASSIGNORS TO LINE-O-GRAPH COMPANY, OF KANSAS CITY, MISSOURI, A CORPORATION OF MISSOURI

ROTOR FOR DISPLAY DEVICES

Application filed March 11, 1931. Serial No. 521,674.

Our invention relates to display devices, and more particularly to a rotatable means, for producing a display continuously moving in the same direction, forming a portion of said display device.

The invention more particularly relates to a rotor or rotatable member having means thereon through which light is adapted to pass to project characters or other means on said rotor, forming the transparent portions thereof, on a suitable translucent member, through which the same may be viewed from the exterior of the display device. The invention particularly relates to the rotor construction and the use of the display means thereon, and is shown as being used in conjunction with a rotor that is operated by means of a rising current of heated air produced by the illuminating means, although a rotor operated by any other suitable means to produce rotation thereof may be utilized in conjunction with the particular display means and the mounting thereof on a rotor, the operation of the rotor by means of the rising current of heated air being preferred because of cheapness and simplicity.

The invention more particularly relates to the particular construction of the rotor itself and the adjustable mounting thereof, as well as the particular mounting of the display means on the rotor so that the same is readily interchangeable to obtain any desired display or arrangement of the display means thereon for projection on the translucent member so as to be visible from the exterior of the device.

It is a particular purpose of the invention to provide a rotor that is so constructed that a series of separate and interchangeable display members, in the form of flexible members having transparent and opaque portions, may be mounted detachably thereon, but which will create the effect, when thrown on the translucent member above referred to, of being an uninterrupted and continuously moving band having thereon the characters or other means that are to be displayed.

Each of the individual flexible display members preferably comprises an opaque portion and a transparent portion, the transparent portion being in the form of characters, such as letters or similar means, whereby each may be a unit that may be associated with the other units in such a manner as to carry any desired message or succession of words or other characters or pictures, that may be desired, in the use of the display device. The flexible members are preferably made of celluloid or similar material of the character used for photographic films.

More specifically the invention comprises a rotor that has a series of windows or openings therein, which are adapted to align with an opening in a housing which carries a translucent member, which may be referred to as a screen, said windows each having associated therewith a closure member or covering member, which overlies the same and which is adapted to have a character provided thereon to be displayed on the screen, said covering member being made of flexible material and being detachably mounted on the rotor and being provided with means for properly aligning the same with said openings to avoid any possibility of escape of light between the various individual display members or cover members, and to avoid any interruption in the apparent continuity of the display means as reproduced on the translucent or screen member.

Other objects and advantages of the invention will appear as the description of the drawings proceeds. It is to be understood, however, that it is not intended to limit the invention to the particular details shown or described except as defined in the claims:

In the drawings:

Fig. 1 is a vertical sectional view through a portion of the display device showing the rotor and associated parts, a portion of the rotor being broken away.

Fig. 2 is a top plan view of the rotor detached.

Fig. 3 is a perspective view of the rotor.

Fig. 4 is a fragmentary enlarged side elevational view thereof.

Fig. 5 is a fragmentary sectional view taken substantially on the line 5—5 of Fig. 4.

Fig. 6 is a perspective view of one of the display members carried by the rotor.

Fig. 7 is a fragmentary perspective view of the rotor, showing a different form of display means and holding means therefor, a display member being omitted to more clearly show the construction of the rotor back of the same.

Fig. 8 is a section taken on the line 8—8 of Fig. 7.

Fig. 9 is a fragmentary inside face view of a portion of the rotor, showing a further modification of the display means and mounting therefor, certain parts being broken away and certain parts omitted for the sake of clearness.

Fig. 10 is a section taken on the line 10—10 of Fig. 9.

Fig. 11 is a view similar to Fig. 9 of a further modification.

Fig. 12 is a view taken on the line 12—12 of Fig. 11, and

Fig. 13 is a fragmentary section taken on the line 13—13 of Fig. 11.

Referring in detail to the drawings, in Figs. 1 to 6 inclusive, the improved display means is shown as comprising a housing 10 having a front wall 11, which has an opening 12 therein and which is elongated horizontally in the well known manner, and which is provided with a translucent closure member 13 overlying the same so as to completely close the opening 12, said closure member being made in any desired manner to obtain the desired amount of light transmission therethrough for obtaining a distinct outline of the characters to be displayed therethrough.

The display device is provided with a horizontal partition 14 and a vertical partition 15 providing a compartment 16, within which suitable lighting means such as the electric lamp 17 is mounted. The partition 14 has a threaded member, such as the nut 18, welded, brazed or otherwise fixedly secured thereto, with which the vertical shaft or standard 19 screw threadedly engages, the lower end portion of said member 19 being provided with threads 20 for this purpose.

The upper end portion of the shaft 19 is provided with a bearing member 21, which engages with a cooperating conical, and, preferably, glass bearing member 22, on the rotor 23, the rotor being provided with an opening through which the member 22 projects and having a plurality of tongues or fingers 24 punched out of the same, which are clinched down on the underside of the flange 25 provided on the conical bearing member 22 for holding the same firmly in position on the rotor. It will be obvious that by adjusting the rod-like member up and down the exact vertical position of the rotor can be definitely determined. This can be readily done by turning the member 19 from the lower end thereof, as access can be readily had to the space 26 below the partition 14. A knurled nut 27 is provided on the member 19 for clamping the same in adjusted position.

The rotor 23 has a horizontal top wall portion 28, which is punched out to form inclined vanes 29 thereon, which are so shaped and arranged relative to the axis of rotation of the rotor that a rising current of air through the rotor will cause rotation of the same in a clockwise direction looking downwardly on the same. The rotor has a substantially cylindrical vertical side wall portion 30, the lower edge portion of which is provided with a stiffening member or bead 31 around the same.

The side wall forming portion 30 of the rotor is provided with a series of equally spaced windows or openings 33 therein, these windows or openings being all of the same size and arranged in alignment so as to form a row around the side wall portion of the rotor substantially at the middle thereof. A pair of tongues 34 and 35, which have portions lying substantially parallel to the outer surface of the wall portion 30, are struck out from said wall portion and lie substantially in alignment with each dividing or separating wall portion 36 between the windows 33.

Cooperating with the rotor are the individual display members 37, which form cover or closure members for the openings or windows 33 overlying the same on the outside of the wall portion 30, and being of such a size as to completely overlap the openings 33 so that the side edges 38 of said members will overlie the dividing wall portions 36. This is done because the members 37 are opaque except for the characters or other display means thereon, and while the spacing of said members 37 is such that there is substantially no slit between the adjacent edges thereof through which light might escape, yet, in order to avoid any possibility of this, the joint between the same indicated at 40 in Figs. 1, 3 and 4 is located substantially in the middle of the dividing wall portion 36, whereby it is impossible for any light to escape through said joint.

In explanation of this feature of the invention it might be stated that the entire rotor, that is, the side wall portion 30, the top 28 and the reinforcing member 32, are made with a light absorbing or dull black surface, as also are all the inner faces of the walls forming the chamber 16, thus preventing reflection and diffusion of light within the chamber and within the rotor.

The members 37 are made with reduced end portions 41 at their upper and lower ends providing shoulders 42 on said members 37, and said reduced tabs or projections 41 on said members 37 are provided with tapering side edges 43. The members 37 are flexible, as the same are preferably made out of a flexible material similar to celluloid, such as used for photographic film, with a coating thereon. When the members 37 are assembled with the rotor, said members are sprung into a slightly curved form and the portions thereof adjacent the shoulders 42 are projected under the tongues 34 and 35 on opposite sides of the same, as will be obvious from Figs. 4 and 5, the tongues 34 and 35 being offset only a sufficient distance from the outer surface of the member 30 so that the portions of the member 37 lying between the same and the adjacent body portion will be firmly held in position thereby. The tapering tongues 41 aid in the location of the members 37 with their corners under the holding tongues 34 and 35, and said tongues are in such a position when the members 37 are assembled with the rotor that the same can be readily engaged by the fingers to flex the members 37 outwardly so that the corners thereof adjacent the shoulders 42 may be disengaged from the holding clips.

The tapering tongues 41, in cooperation with the adjoining side edges 44 of the members 34 and 35 also serve to definitely align the members 37 with each other and with the openings 33, thus placing the characters 39 on the members 37 in such alignment that the same will appear to be parallel or in any other desired fixed relative relation to each other when projected through the translucent member 13.

Obviously the number and spacing of the windows and the type of character or other transparency provided on the member 37 may be varied as desired and as conditions may determine, and it will be obvious that due to the detachable and interchangeable character of the individual display members 37, any desired arrangement thereof relative to each other on the rotor may be obtained by the arrangement described. While a flexible material is preferred for the members 37, and while the embodiment of the invention contemplates flexing the same to assemble the same with a rotor, it is obvious that the same may be assembled in any other desired manner with the rotor, the important feature being that each of the members 37 is provided with means for positively aligning the same with the other members 37 and with the openings in the rotor so that there will be no leakage of light at points between said members and so that the said display members 37 will act as closures or covers completely overlapping the edges of the openings 33.

In Fig. 7 the rotor 28' is shown as having a side wall portion 50 provided with openings 51, and a pair of side flanges 52 and 53 are provided which align with the edges of the openings 51, and which have the inwardly extending flanges 54, which overlie the openings 51, the flanges 52 and 53 being of such a height that the flanges 54 will be spaced only slightly more than the thickness of the display member 55 from the outer face of the side wall portion 50 of the rotor.

The display members 55 are engaged with the rotor by slipping the same endwise in a downward direction back of the flanges 54, the side edges 56 of the members 55 will then engage with the flanges 52 and 53 and the outer faces thereof will engage with the flanges 54, the inner faces of the members 55 engaging the outer face of the wall 50 above and below the openings 51 and the lower ends thereof will engage with the bead 57 running around the bottom of the side wall 50, said bead being rolled thereon in a well known manner. Due to the provision of the flanges 54, the members 55 will overlap all edges of the openings provided in the side wall 50. Although the openings 51 are of the same width as the display members 55, the flanges 54 narrow the effective width of the openings so that the members 55 will overlap the side edges of said openings, which are really the inner edges of the flanges 54, and will prevent any light from escaping at the sides thereof.

The bead 57 and the flanges 52 and 53 will position the display members 55 on the rotor and relative to each other and will maintain the same in fixed position during the operation of the rotor. The display members 55 are made of the same material as the members 37, and are provided with transparent portions 58, which form the characters or other display means provided thereon, the remainder thereof being opaque and being preferably provided with the transparent and opaque portions in the same manner as are the members 37. The particular advantage of the arrangement shown in Figs. 7 and 8 is that the display members 55 are rectangular and can be cut out of a sheet without the necessity of any special die by merely a straight cutter blade, which is not true of the form shown in Fig. 6.

It is very desirable to space the rotor as closely to the member 13 as is practically possible, and it has been found in practice that it is very desirable to have the flexible transparent display members on the inner face of the rotor, rather than the outer face thereof, in order to make it possible to place the side wall of the rotor closer to the translucent member 13, and such an arrangement is shown in the form shown in Figs. 9 and 10. In Figs. 9 and 10 the rotor is shown as being provided with a side wall portion 60, being of a cylindrical form as in the previously described forms of the invention, and in this form of the invention, the openings 61 are provided with the wall portions 62 separating the same.

The material of the wall 60 is provided with a plurality of indentations which are inwardly struck portions aligning with the openings, one set of these indentations is arranged at the upper margin of the openings 61, said indentations being indicated by the numeral 63 and being provided with the straight side edges 64 and the inclined walls 65, which converge at the center of the indentation. The other set of indentations are indicated by the numeral 66 and are located in alignment with the openings 61 and below the same, said indentations 66 taking the form of offset lips or tongues, which have straight shoulders 67 thereon, with which the straight bottom edges 68 of the display members 69 engage. The top edges of the display members 69 are provided with straight portions 70, and inclined portions 71, which are adapted to engage the inclined portions 65 of the offsets or indentations 63 to properly position the display members 69 and hold the same in fixed position on the rotor, and relative to each other. In the form of the invention shown in Figs. 9 and 10 the members 69 have the side edges 72 thereof abutting, and are arranged in overlapping arrangement to the separating wall portions 62 between the openings 61 and abut substantially midway of said wall portions 62.

In Figs. 11 and 12, another form of rotor and display means is shown in which the individual display members are located on the inside of the side wall of the rotor and in which the same are so made that the display members may be rectangular in form so that no special type of die is needed for cutting the same, as would be the case in the form shown in Figs. 9 and 10. In the form shown in Figs. 11 and 12, the side wall 80 of the rotor is provided with a plurality of openings 81, arranged in a circular series, as in the previously described forms, and having the separating wall portions 82 between the same. In this form of the invention a pair of tongues is punched out of the metal of the side wall 80, the same being oppositely directed, but having the portions 83 and 84 thereof that extend outwardly at right angles to the face of the side wall 80 of the rotor in vertical alignment, and aligned with the vertical central line of the separating wall 82 between each pair of adjoining openings 81. The overhanging portions 85 and 86 on the tongues, are, however, extended in opposite directions. Thus the adjoining edges of the two of the adjoining flexible display members 87 will engage on opposite sides of the aligned outwardly extending portions 83 and 84 of said tongues, and one thereof will underlie the lateral portion 85 of one of said tongues and the other lateral portion 86 of the other side of said tongues, there being a pair of tongues in alignment with each separating wall 82.

It will be obvious that there will be a pair of tongues that are transversely out of alignment, engaging each of said display members 87 above the openings 81, one on each side thereof, and that there will be a pair of the outwardly extending portions 83 and 84 of the tongues engaging the side edges of each of the members 87 at vertically spaced points. These, in cooperation with the inwardly struck lips or tongues 88 below the openings 81 and in alignment with the separating walls 82, will hold the display members 87 in alignment with each other and in proper position relative to each other and the openings, so that the same will overlap the openings on all edges thereof. In this arrangement of the invention the display members 87, which are made in substantially the same manner as previously described for the other forms of the invention, may be rectangular in shape, as will be evident from Fig. 11. The adjoining edges thereof, are, however, spaced the thickness of the metal of the holding and positioning tongues due to the interposition of the portions 83 and 84 of the tongues between the same. There will be sufficient overlapping of the walls 82 by the members 87, however, to prevent leakage of light around the side edges 89 of said members 87.

What we claim is:—

1. In a display device, a housing having an opening therein, illuminating means in said housing, a rotor in said housing having a vertical axis and comprising an opaque vertical circumferential wall portion extending around said illuminating means, said circumferential wall portion having a circumferential series of openings therein adapted to align with the opening in said housing and display means on said rotor overlying said openings and having opaque and transparent portions.

2. In a display device, a housing having an opening therein, illuminating means in said housing, a rotor in said housing mounted to rotate about a vertical axis and comprising an opaque circumferential wall portion extending around said illuminating means, said circumferential wall portion having a circumferential series of openings therein adapted to align with the opening in said housing, and individual substantially flat display members, having opaque and transparent portions, each detachably mounted on said rotor and overlying one of said openings.

3. In a display device, a housing having an opening therein, illuminating means in said housing, a rotor in said housing comprising an opaque body portion extending around said illuminating means, said body portion having a series of openings therein adapted to align with the opening in said housing, and individual display members, having opaque and transparent portions, each detachably mounted on said rotor and overlying one of said openings, said display members and said body portion having cooperating formations thereon positioning and holding said display members on said rotor.

4. In a display device, a housing having an opening therein, illuminating means in said housing, a rotor in said housing comprising an opaque body portion extending around said illuminating means, said body portion having a series of openings therein adapted to align with the opening in said housing, and individual flexible display members, having opaque and transparent portions, each detachably mounted on said rotor and overlying one of said openings.

5. In a display device, a rotor comprising a body portion having an open bottom, a top having openings therein and a side wall provided with an opening therein and a display member, having transparent and opaque portions, closing said opening in said side wall and overlapping all edges thereof.

6. In a display device, a rotor comprising a body portion having a side wall provided with an opening therein, a flexible display member, having transparent and opaque portions, closing said opening and overlapping all edges thereof, and means on said body portion and spaced therefrom for detachably securing said display member in fixed position relative to said opening.

7. In a display device, a rotor comprising a body portion having a side wall provided with an opening therein, a display member, having transparent and opaque portions closing said opening and overlapping the same, said display member being detachable from said rotor, fixed means on said body portion for holding said display member in fixed position in overlapping relation to said opening and cooperating means on said display member and said holding means for positioning said display member relative to said opening.

8. In a display device, a rotor comprising a body portion having a side wall provided with an opening therein, a display member, having transparent and opaque portions closing said opening and overlapping the same, said display member being detachable from said rotor, means on said body portion for holding said display member in fixed position in overlapping relation to said opening and cooperating means on said display member and said holding means for positioning said display member relative to said opening, comprising a tapering tab on said display member.

9. In a display device, a housing having an opening therein, illuminating means in said housing, a rotor in said housing comprising an opaque body portion extending around said illuminating means, said body portion having a series of openings therein adapted to align with the opening in said housing, display means on said rotor overlying said openings, having opaque and transparent portions, means for rotatably supporting said rotor and means for adjusting said supporting means in the direction of the axis of rotation of said rotor to align the series of openings in said rotor with the opening in said housing.

10. In a display device, a rotor comprising a body portion having a cylindrical side wall provided with a series of equidistantly spaced duplicate openings comprising a row of windows extending around said side wall, and display means mounted thereon comprising a series of individual flexible members each overlying one of said openings and independently detachable from said rotor.

11. In a display device, a rotor comprising a body portion having a cylindrical side wall provided with a series of equidistantly spaced duplicate openings comprising a row of windows extending around said side wall, and display means mounted thereon comprising a series of individual flexible closure members each overlying one of said openings and independently detachable from said rotor, said members having transparent light transmitting portions and opaque portions.

12. In a display device, a rotor comprising a body portion having a cylindrical side wall provided with a series of equidistantly spaced duplicate openings comprising a row of windows extending around said side wall, and display means mounted thereon comprising a series of individual members each overlying one of said openings and independently detachable from said rotor, said side wall having holding fingers thereon lying above and below said row of windows and alternating therewith, each of said fingers engaging a pair of adjoining individual display members to detachably hold the same in position on said rotor.

13. In a display device, a rotor comprising a body portion having a cylindrical side wall provided with a series of equidistantly spaced duplicate openings comprising a row of windows extending around said side wall, and display means mounted thereon comprising a series of individual members each overlying one of said openings and independently detachable from said rotor, said side wall having tongues punched out of the same wider than the dividing walls between said windows and aligning with said dividing walls forming holding fingers thereon lying above and below said row of windows and alternating therewith, each of said fingers engaging a pair of adjoining individual display members to detachably hold the same in position of said rotor.

14. In a display device, a rotor comprising a body portion having a cylindrical side wall provided with a series of equidistantly spaced duplicate openings comprising a row of windows extending around said side wall, and display means mounted thereon comprising a series of individual flexible members each overlying one of said openings and independently detachable from said rotor, said members being provided with a coating providing opaque portions thereon and having transparent portions.

15. In a display device, a rotor comprising a body portion having a top wall provided with a central opening, a conical glass bearing member mounted in said opening, said bearing member having a base flange underlying said top wall adjacent said opening and fingers on said top wall clinched against the under side of said flange.

16. In a display device, a rotor comprising a body portion having a cylindrical side wall provided with a series of equidistantly spaced duplicate openings comprising a row of windows extending around said side wall, and display means mounted thereon comprising a series of individual members each overlying one of said openings and independently detachable from said rotor, said side wall having tongues punched out of the same wider than the dividing walls between said windows and aligning with said dividing walls forming holding fingers thereon lying above and below said row of windows and alternating therewith, each of said fingers engaging a pair of adjoining individual display members to detachably hold the same in position on said rotor, and said display members having tapering tabs on the upper and lower ends thereof cooperating with the adjacent side edges of said fingers to position said members relatively to said windows and to each other.

17. In a display device, a rotor comprising a body portion having a cylindrical side wall provided with a series of equidistantly spaced duplicate openings comprising a row of windows extending around said side wall, and display means mounted thereon comprising a series of individual members each overlying one of said openings and independently detachable from said rotor, and means engaging opposite side edges of said display members to position the same relative to each other and to said openings and comprising means for holding said display members on said rotor.

18. In a display device, a rotor comprising a body portion having a cylindrical side wall provided with a series of equidistantly spaced duplicate openings comprising a row of windows extending around said side wall, and display means mounted thereon comprising a series of individual members each overlying one of said openings and independently detachable from said rotor, and a pair of angular flanged members engaged opposite side edges of said display members to position the same relative to each other and hold the came in engagement with said rotor.

19. In a display device, a rotor comprising a body portion having a cylindrical side wall provided with a series of equidistantly spaced duplicate openings comprising a row of windows extending around said side wall, and display means mounted thereon comprising a series of individual members each overlying one of said openings and independently detachable from said rotor, and means engaging opposite ends of said display members to hold the same on said rotor and position the same relative to each other and to said openings, comprising offset wall portions, one of said offset portions having inclined shoulders, and one end of each of said display members having correspondingly inclined edges engaging said shoulders.

20. In a display device, a rotor comprising a body portion having a cylindrical side wall provided with a series of equidistantly spaced duplicate openings, and display means thereon comprising a plurality of individual members each overlying one of said openings, and independently detachable from said rotor, said members each having inclined marginal edges thereon, and means on said rotor engaging said inclined edges on said display members to position the same relative to each other and to said openings.

21. In a display device, a rotor comprising a body portion having a side wall provided with an opening therein and a display member engaging the inner face of said side wall and lying entirely within the outer bounding surface of said side wall, said member having transparent and opaque portions, closing said opening and overlapping all edges thereof.

22. In a display device, a rotor comprising a body portion having a cylindrical side wall provided with a series of equidistantly spaced duplicate openings comprising a row of windows extending around said side wall, and display means mounted thereon comprising a series of individual flexible members each overlying one of said openings and independently detachable from said rotor, said display members engaging the inner face of said side wall and said side wall having inwardly offset means thereon engaging said display members to hold the same in position on said side wall.

23. In a display device, a rotor comprising a body portion having a cylindrical side wall provided with a series of equidistantly spaced duplicate openings comprising a row of windows extending around said side wall, and display means mounted thereon comprising a series of individual members each overlying one of said openings and independently detachable from said rotor, and a pair of angular flanges extending along the opposite vertical side edges of said openings, and engaging opposite side edges of said display members to position the same relative to each other and hold the same in engagement with said rotor.

In testimony whereof, we hereunto subscribe our names this 28th day of February, 1931.

CHARLES E. CHASE.
EDWIN J. FIEGEL.

CERTIFICATE OF CORRECTION.

Patent No. 1,891,797.  December 20, 1932.

CHARLES E. CHASE, ET AL.

It is hereby certified that error appears in the printed specification of the above numbered patent requiring correction as follows: Page 6, line 62, claim 18, for "engaged" read "engaging", and line 65 for "came" read "same"; and that the said Letters Patent should be read with these corrections therein that the same may conform to the record of the case in the Patent Office.

Signed and sealed this 28th day of February, A. D. 1933.

M. J. Moore,
Acting Commissioner of Patents.

(Seal)